United States Patent
Cheng et al.

(10) Patent No.: US 8,824,415 B2
(45) Date of Patent: Sep. 2, 2014

(54) CROSS-SCHEDULED RANDOM ACCESS ORDER TRANSMITTING AND RECEIVING METHODS, DEVICES AND SYSTEMS

(75) Inventors: Jung-Fu Cheng, Fremont, CA (US); Robert Baldemair, Solna (SE); Mattias Frenne, Uppsala (SE); Daniel Larsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 155 days.

(21) Appl. No.: 13/421,196

(22) Filed: Mar. 15, 2012

(65) Prior Publication Data

US 2013/0044700 A1 Feb. 21, 2013

Related U.S. Application Data

(60) Provisional application No. 61/523,656, filed on Aug. 15, 2011.

(51) Int. Cl.
*H04W 4/00* (2009.01)
*H04W 74/00* (2009.01)
*H04W 74/04* (2009.01)

(52) U.S. Cl.
CPC ............ *H04W 74/004* (2013.01); *H04W 74/04* (2013.01)
USPC ........... 370/330; 370/329; 370/436; 370/468; 370/478

(58) Field of Classification Search
USPC ................ 370/328–330, 335–337, 343–344, 370/436–439, 441–442, 468, 478–480, 482, 370/496
See application file for complete search history.

(56) References Cited

FOREIGN PATENT DOCUMENTS

WO       WO 2011/086228 A1 *  7/2011 ............ H04W 72/04

OTHER PUBLICATIONS

"3rd Generation Partnership Project; Technical Specification Group Radio Access Network; Evolved Universal Terrestrial Radio Access (E-UTRA); Multiplexing and channel coding (Release 8)", 3GPP Standard; No. V8.7.0, May 1, 2009, pp. 1-60.*

"3rd Generation Partnership Project; Technical Specification Group Radio Access Network; Evolved Universal Terrestrial Radio Access (E-Utra); Multiplexing and channel coding (Release 10)", 3GPP Standard vol. RAN WG1, no. V10.2.0, Jun. 21, 2011, pp. 1-78.*

(Continued)

*Primary Examiner* — Awet Haile
*Assistant Examiner* — Eric Myers
(74) *Attorney, Agent, or Firm* — Myers Bigel Sibley & Sajovec, P.A.

(57) ABSTRACT

A node of a wireless network includes processor circuitry that is configured to obtain an identification of a cell on which a user equipment shall transmit a random access preamble and to encode the identification of the cell on which the user equipment shall transmit the random access preamble into at least one unused bit position of a physical downlink control channel random access order. A transmitter is responsive to the processor circuitry and is configured to transmit the physical downlink control channel random access order including the identification of the cell that was encoded into the at least one unused bit position of the physical downlink control channel random access order. Related user equipment, systems and methods are also described.

36 Claims, 17 Drawing Sheets

(56) References Cited

OTHER PUBLICATIONS

International Search Report and Written Opinion of the International Searching Authority, Application No. PCT/IB2012/054116, Dec. 3, 2012.

$3^{rd}$ Generation Partnership Project; Technical Specification Group Radio Access Network; Evolved Universal Terrestrial Radio Access (E-UTRA); Multiplexing and channel coding (Release 8):, 3GPP Standard; 3GPP TS 36.212, $3^{rd}$ Generation Partnership Project (3GPP), Mobile Competence Centre; 650, Route des Lucioles; F-06921 Sophia-Antipolis Cedex; France, V8.7.0, May 1, 2009, 60 pages.

$3^{rd}$ Generation Partnership Project; Technical Specification Group Radio Access Network; Evolved Universal Terrestrial Radio Access (E-UTRA); Multiplexing and channel coding (Release 10):, 3GPP Standard; 3GPP TS 36.212, $3^{rd}$ Generation Partnership Project (3GPP), Mobile Competence Centre; 650, Route des Lucioles; F-06921 Sophia-Antipolis Cedex; France, V10.2.0, Jun. 21, 2011, 78 pages.

CATT: "Remaining issues on CIF in LTE-A", 3GPP Draft; R1-100872, $3^{rd}$ Generation Partnership Project (3GPP), Mobile Competence Centre; 650, Route des Lucioles; F-06921 Sophia-Antipolis Cedex; France, RAN WG1 Meeting #60, San Francisco, Feb. 22, 2010, 3 pages.

\* cited by examiner

Control region    Control signaling    Reference symbols

*Aggregated bandwidth of 100 MHz*

CROSS-SCHEDULED RANDOM ACCESS ORDER TRANSMITTING AND RECEIVING METHODS, DEVICES AND SYSTEMS

CROSS-REFERENCE TO RELATED APPLICATION

This non-provisional patent application claims priority to U.S. Provisional Application No. 61/523,656, filed Aug. 15, 2011, entitled Cross-Scheduled Random Access Order, the disclosure of which is hereby incorporated herein by reference as if set forth fully herein.

TECHNICAL FIELD

Various embodiments described herein relate to radio frequency communications and, more particularly, to wireless communication networks and devices, and methods of operating the same.

BACKGROUND

Wireless communication networks are increasingly being used for wireless communications with various types of wireless user equipment. The wireless network itself may include a plurality of wireless base stations, also commonly referred to as "base stations", "radio access nodes", "RAN nodes", "NodeBs", "eNodeBs" or simply as "nodes", that define a plurality of cells, and a core network that controls the base stations and interfaces the base stations with other wired and/or wireless networks. The nodes may be terrestrial and/or space-based. The nodes communicate with wireless User Equipment (UE), also referred to as "user equipment", "wireless terminals" or "mobile stations" or simply as "terminals", using radio resources that are allocated to the wireless network. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system). The nodes may use licensed and/or unlicensed frequency spectrum. Radio resources may be assigned to UEs by the wireless network upon initial communication and may be reassigned due to, for example, movement of the UEs, changing bandwidth requirements, changing network traffic, etc.

Release 10 (Rel-10) of Long Term Evolution (LTE) wireless technology allows the aggregation of multiple carriers to send signals between a node and user equipment. The main carrier may be referred to as a primary carrier, while the additional carrier(s) may be referred to as secondary carrier(s). Also the terms Primary Cell (PCell) and Secondary Cell (SCell) are commonly used terminology to refer to primary carrier and secondary carrier, respectively. In Rel-10 of LTE, the secondary carrier is generally required to have features of a regular LTE carrier. That is, it carries synchronization signals over time and frequency synchronization, reference symbols for channel estimation and control signals for data allocations and other control functions much like the primary carrier.

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion of this section.

SUMMARY OF THE INVENTION

Various embodiments described herein provide a node of a wireless network that can provide cross-scheduled random access order transmitting. The node includes processor circuitry that is configured to obtain an identification of a cell on which a user equipment shall transmit a random access preamble and to encode the identification of the cell on which the user equipment shall transmit the random access preamble into at least one unused bit position of a physical downlink control channel random access order. A transmitter is responsive to the processor circuitry and is configured to transmit the physical downlink control channel random access order including the identification of the cell that was encoded into the at least one unused bit position of the physical downlink control channel random access order. Thus, unused bit(s) of a random access order can be used to encode identification of a cell on which a user equipment shall transmit a random access preamble. Cross-scheduled random access order transmitting is thereby provided.

As used herein, an "unused bit position" means a bit position that is set to a given fixed value in a specific control information format for random access orders for a primary cell that is defined by a standard governing the physical downlink control channel, and does not convey additional information in the random access order for a primary cell. For example, in example LTE embodiments described herein, "unused bit positions" may refer to bit positions that would be set to a given fixed value in DCI Format 1A random access orders for a primary cell. Although such bits may be described as being "unused" in reference to their utilization in the relevant random access order format for a primary cell, such bits may nonetheless be used to convey information (such as an identification of a cell and/or a subframe) in the random access orders described herein.

In some embodiments, the physical downlink control channel random access order uses a downlink control information format and the at least one unused bit position comprises at least one bit position of a redundancy version field and/or at least one bit position of a transmit power control field. In other embodiments, the physical downlink control channel random access order uses a downlink control information format and the at least one unused bit position comprises at least one bit position of a downlink assignment index field. In still other embodiments, the physical downlink control channel random access order uses a downlink control information format and the at least one unused bit position comprises a bit position of a sounding reference signals flag field. Combinations and subcombinations of these unused bit positions may also be used according to various embodiments described herein. In some embodiments, the at least one unused bit position comprises a final one, two, three, four or five payload bit positions of the downlink control information format. Moreover, in any of the embodiments described herein, the physical downlink control channel random access order can use a DCI Format 1A format and the at least one unused bit position comprises at least one unused bit position in the physical downlink control channel random access order that uses the DCI Format 1A format.

In still other embodiments, the processor circuitry is configured to obtain the identification of a cell and a subframe on which the user equipment shall transmit a random access preamble and to encode the identification of the cell and the subframe on which the user equipment shall transmit the random access preamble into the at least one unused bit position of a physical downlink control channel random access order. Moreover, the transmitter may be configured to transmit the physical downlink control channel random access order including the identification of the cell and the subframe that were encoded into the at least one unused bit position of the physical downlink control channel random access order.

Analogous methods of transmitting a physical downlink control channel random access order may be provided for a node of a wireless network according to various embodiments described herein. These methods may comprise obtaining an identification of a cell on which a user equipment shall transmit a random access preamble; encoding an identification of the cell on which the user equipment shall transmit the random access preamble into at least one unused bit position of a physical downlink control channel random access order; and transmitting the physical downlink control channel random access order including the identification of the cell on which the user equipment shall transmit the random access preamble that was encoded into the at least one unused bit position of the physical downlink control channel random access order. The at least one unused bit position may be provided according to any of the embodiments described above for the node. Moreover, the unused bit position(s) may also be used to encode the subframe on which the user equipment shall transmit the random access preamble, according to any of the embodiments described above for the node.

Various other embodiments described herein can provide a user equipment of a wireless network. The user equipment includes a receiver that is configured to receive a physical downlink control channel random access order including an identification of a cell on which the user equipment shall transmit a random access preamble, wherein the identification of the cell is encoded into at least one unused bit position of the physical downlink control channel random access order that was received. Processor circuitry is responsive to the receiver and is configured to determine a cell for random access for the physical downlink control channel random access order that was received. A transmitter is responsive to the processor circuitry and is configured to transmit the random access preamble on the cell that is identified. The at least one unused bit position may be provided according to any of the embodiments described above in connection with the node. Moreover, the receiver may be configured to also receive an identification of a subframe on which the user equipment shall transmit a random access preamble and the transmitter may be configured to transmit the random access preamble on the cell and in the subframe that are identified, according to any of the embodiments described above in connection with the node.

Analogous random access preamble transmitting methods for a user equipment of a wireless network may also be provided according to various embodiments described herein. These methods may comprise receiving a physical downlink control channel random access order including an identification of a cell on which the user equipment shall transmit a random access preamble, wherein the identification of the cell is encoded into at least one unused bit position of the physical downlink control channel random access order that was received; determining a cell for random access for the physical downlink control channel random access order that was received; and transmitting the random access preamble on the cell that is identified. The at least one unused bit position may be provided according to any of the embodiments described above for the node. Moreover, the unused bit position may also be used to encode the subframe on which the user equipment shall transmit the random access preamble, according to any of the embodiments described above for the node.

DETAILED DESCRIPTION 1.0 Introduction

Various embodiments described herein allow cross-scheduled random access orders in carrier aggregation systems, by allowing a node of a wireless network to encode an identification of the cell on which the user equipment shall transmit the random access preamble into at least one unused bit position of a physical downlink control channel random access order, and to transmit the physical downlink control channel random access order including the identification of the cell to user equipment. The user equipment receives the physical downlink control random access order including the identification of the cell that is encoded into at least one unused bit position of the physical downlink control channel random access order. The user equipment then determines a cell for random access for the physical downlink control channel random access order and transmits the random access preamble on the cell that is identified.

Prior to describing various embodiments, a technical overview of LTE will be provided to facilitate understanding of various embodiments described herein.

1.1 LTE Overview

The approaches described in this LTE Overview section and its subsections could be pursued, but are not necessarily approaches that have been previously conceived or pursued. Therefore, unless otherwise indicated herein, the approaches described in this LTE Overview section and its subsections are not prior art to claims in this application and any application claiming priority from this application, and are not admitted to be prior art by inclusion of this section.

Figure 1:
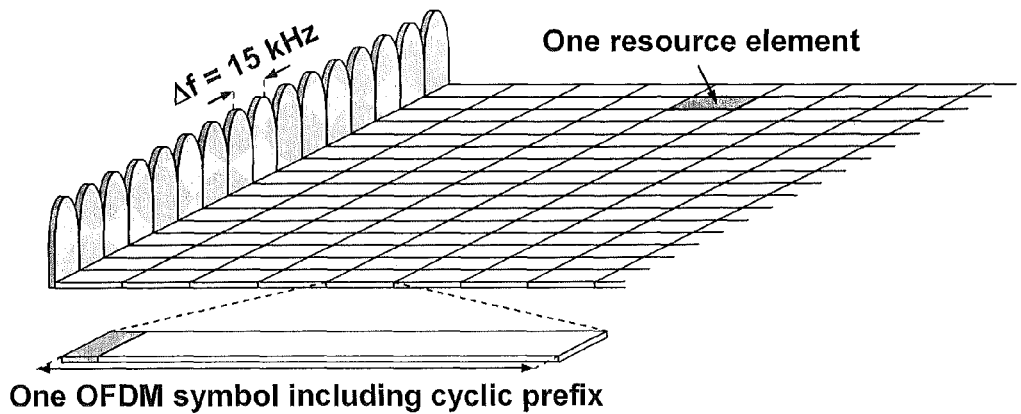
FIG. 1 conceptually illustrates an LTE downlink physical resource.
Figure 2:
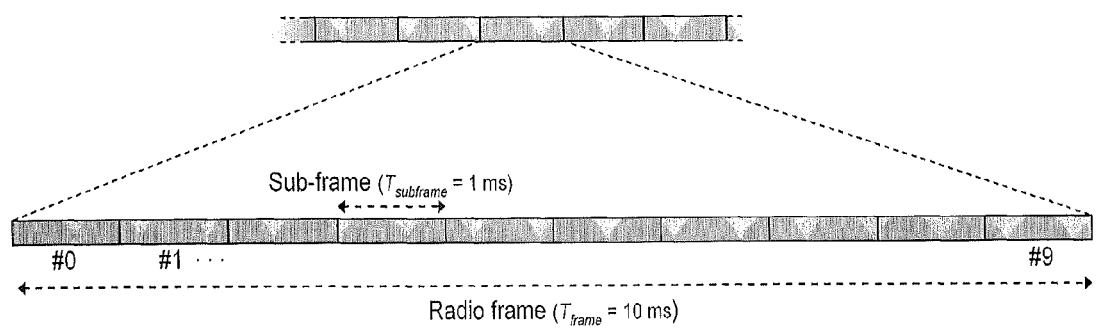
FIG. 2 conceptually illustrates an LTE time domain structure.

LTE uses Orthogonal Frequency Division Multiplex (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms. See FIG. 2.

Furthermore, the resource allocation in LTE is typically described in terms of Resource Blocks (RB), where a resource block corresponds to one slot (0.5 ms) in the time domain and 12 subcarriers in the frequency domain. A pair of two adjacent resource blocks in the time direction (1.0 ms) is known as a resource block pair. Resource blocks are numbered in the frequency domain, starting with 0 from one end of the system bandwidth.

The notion of Virtual Resource Blocks (VRB) and Physical Resource Blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair. Hence, two consecutive and localized VRB are also placed as consecutive PRBs in the frequency domain. On the other hand, the distributed VRBs are not mapped to consecutive PRBs in the frequency domain, thereby providing frequency diversity for data channel transmitted using these distributed VRBs.

Figure 3:
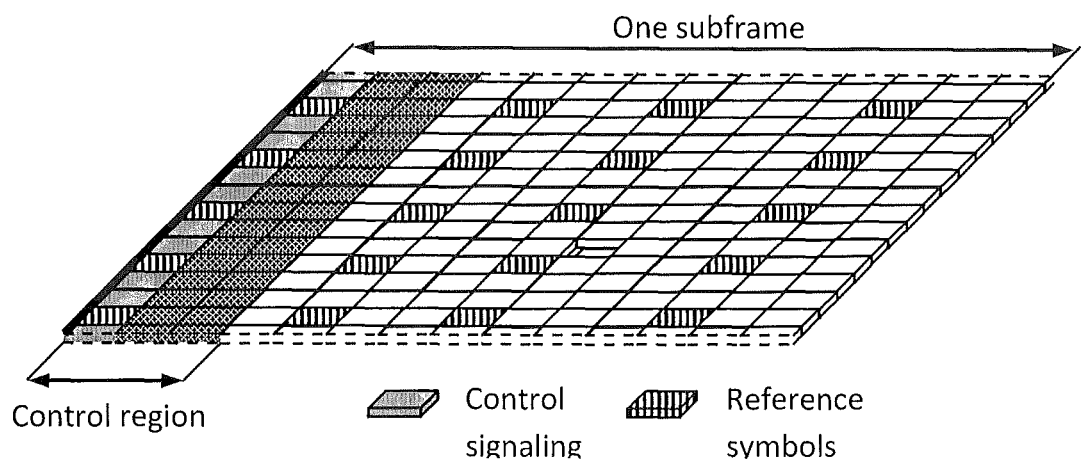
FIG. 3 conceptually illustrates an LTE downlink subframe.

Downlink transmissions are dynamically scheduled, i.e., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains Common Reference Symbols (CRS), which are known to the receiver and used for coherent demodulation of, e.g., the control information. A downlink system with CFI=3 OFDM symbols as control is illustrated in FIG. 3.

1.1.1 Carrier Aggregation

The LTE Rel-10 specifications have recently been standardized, supporting Component Carrier (CC) bandwidths up to 20 MHz (which is the maximal LTE Rel-8 carrier bandwidth). Hence, an LTE Rel-10 operation wider than 20 MHz is possible and appears as a number of LTE carriers to an LTE Rel-10 terminal.

Figure 4:
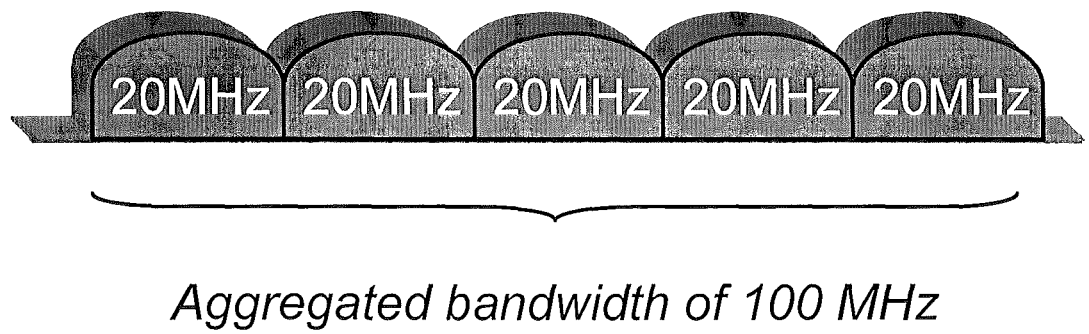
FIG. 4 conceptually illustrates an aggregated carrier in LTE.

In particular, for early LTE Rel-10 deployments it can be expected that there will be a smaller number of LTE Rel-10-capable terminals compared to many LTE legacy terminals. Therefore, it is desirable to assure an efficient use of a wide carrier also for legacy terminals, i.e., that it is possible to implement carriers where legacy terminals can be scheduled in all parts of the wideband LTE Rel-10 carrier. One way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 4.

The Rel-10 standard supports up to 5 aggregated carriers where each carrier is limited in the RF specifications to have a one of six bandwidths namely 6, 15, 25, 50, 75 or 100 RB (corresponding to 1.4, 3, 5, 10, 15 and 20 MHz, respectively).

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. Note that the number of CCs configured in the network may be different from the number of CCs seen by a terminal: A terminal may for example support more downlink CCs than uplink CCs, even though the network offers the same number of uplink and downlink CCs.

During initial access, a LTE Rel-10 terminal behaves similar to a LTE Rel-8 terminal. Upon successful connection to the network a terminal may—depending on its own capabilities and the network—be configured with additional CCs in the UL and/or DL. Configuration is based on Radio Resource Control (RRC). Due to the heavy signaling and rather slow speed of RRC signaling it is envisioned that a terminal may be configured with multiple CCs even though not all of them are currently used. If a terminal is activated on multiple CCs this would imply it has to monitor all DL CCs for Physical Downlink Control CHannel (PDCCH) and Physical Downlink Shared CHannel (PDSCH). This implies a wider receiver bandwidth, higher sampling rates, etc., which may result in high power consumption.

1.1.2 Timing Alignment

Figure 5:
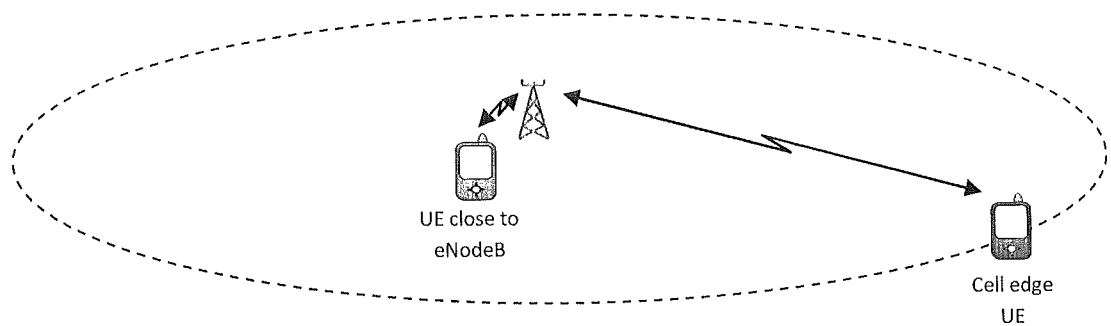
FIG. 5 illustrates a cell with two UEs at different distances from a node.
Figure 6:
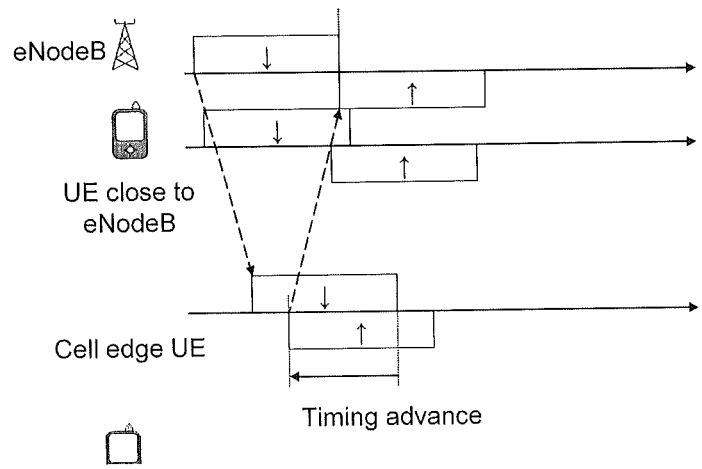
FIG. 6 is a timing diagram illustrating timing advance of uplink transmissions depending on distance to a node.

In order to preserve the orthogonality in UL, the UL transmissions from multiple UEs generally need to be time aligned at the eNodeB. Since UEs may be located at different distances from the eNodeB (see FIG. 5), the UEs will need to initiate their UL transmissions at different times. A UE far from the eNodeB needs to start transmission earlier than a UE close to the eNodeB. This can, for example, be handled by time advance of the UL transmissions, wherein a UE starts its UL transmission before a nominal time given by the timing of the DL signal received by the UE. This concept is illustrated in FIG. 6.

The UL timing advance is maintained by the eNodeB through timing advance commands to the UE based on measurements on UL transmissions from that UE.

Through timing advance commands, the UE is ordered to start its UL transmissions earlier or later. This applies to all UL transmissions except for random access preamble transmissions on the Physical Random Access CHannel (PRACH), i.e., including transmissions on the Physical Uplink Shared CHannel (PUSCH), Physical Uplink Control Channel (PUCCH), and Sounding Reference Signals (SRS).

There is a strict relation between DL transmissions and the corresponding UL transmission. Examples of this are: the timing between a DL-Shared CHannel (SCH) transmission on PDSCH to the Hybrid Automatic Repeat Request (HARQ) Acknowledgement/Non-Acknowledgement (ACK/NACK) feedback transmitted in UL (either on PUCCH or PUSCH); and the timing between an UL grant transmission on PDCCH to the UL-SCH transmission on PUSCH.

By increasing the timing advance value for a UE, the UE processing time between the DL transmission and the corresponding UL transmission decreases. For this reason, an upper limit on the maximum timing advance has been defined by the Third Generation Partnership Project (3GPP) in order to set a lower limit on the processing time available for a UE. For LTE, this value has been set to roughly 667 us which corresponds to a cell range of 100 km (note that the Timing Advance (TA) value compensates for the round trip delay).

In LTE Rel-10 there is only a single timing advance value per UE and all UL cells are assumed to have the same transmission timing. The reference point for the timing advance is the receive timing of the primary DL cell.

In LTE Rel-11, different serving cells used by the same UE may have different timing advances. Most likely the serving cells sharing the same TA value (for example depending on the deployment) will be configured by the Network (NW) to belong to a so called TA group. If at least one serving cell of the TA group is time aligned, all serving cells belonging to the same group may use this TA value. To obtain time alignment for an Scell belonging to a different TA group than the Primary Cell (PCell), the current 3GPP assumption is that NW initiated random access may be used to obtain initial TA for this Secondary Cell (SCell) (and for the TA group the SCell belongs to).

1.1.3 Random Access

Figure 7:
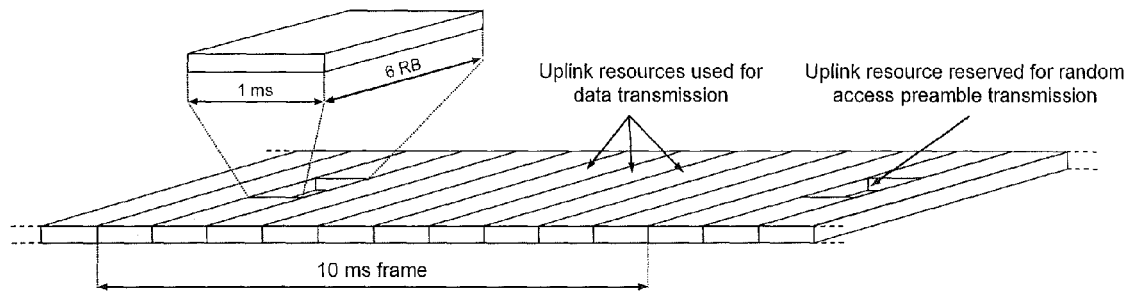
FIG. 7 conceptually illustrates random access resources.

In LTE, a mobile terminal may need to contact the network (via the eNodeB) without having a dedicated resource in the Uplink (from UE to base station). To handle this, a random access procedure is available where a UE that does not have a dedicated UL resource may transmit a signal to the base station. The first message of this procedure is typically transmitted on a special resource reserved for random access, a Physical Random Access CHannel (PRACH). This channel can for instance be limited in time and/or frequency (as in LTE). See FIG. 7. The resources available for PRACH transmission is provided to the terminals as part of the broadcasted system information (or as part of dedicated RRC signaling in case of e.g. handover).

In LTE, the random access procedure can be used for a number of different reasons. Among these reasons are:
Initial access (for UEs in the LTE_IDLE or LTE_DETACHED states);
Incoming handover;
Resynchronization of the UL;
Scheduling request (for a UE that is not allocated any other resource for contacting the base station; and
Positioning.

Figure 8:
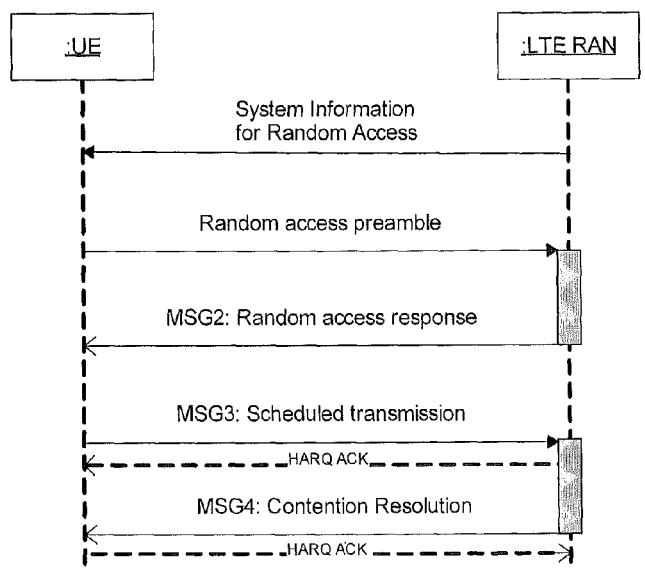
FIG. 8 illustrates signaling over the air interface for contention-based random access in LTE.

The contention-based random access procedure used in LTE is illustrated in FIG. 8. The UE starts the random access procedure by randomly selecting one of the preambles available for contention-based random access. The UE then transmits the selected random access preamble on the Physical Random Access CHannel (PRACH) to eNode B in the Radio Access Network (RAN).

The RAN acknowledges any preamble it detects by transmitting a random access response (MSG2) including an initial grant to be used on the uplink shared channel, a temporary Cell Radio Network Temporary Identifier (C-RNTI), and a time alignment (TA) update based on the timing offset of the preamble measured by the eNodeB on the PRACH. The MSG2 is transmitted in the DL to the UE and its corresponding PDCCH message Cyclic Redundancy Check (CRC) is scrambled with the Random Access—RNTI (RA-RNTI).

When receiving the response, the UE uses the grant to transmit a message (MSG3) that in part is used to trigger the establishment of radio resource control and in part to uniquely identify the UE on the common channels of the cell. The timing alignment command provided in the random access response is applied in the UL transmission in MSG3. The eNB can change the resources blocks that are assigned for a MSG3 transmission by sending an UL grant that's CRC is scrambled with the Temporary Cell—RNTI (TC-RNTI). If the UE already has a C-RNTI assigned it will include the C-RNTI in MSG3, otherwise it includes a core network identifier.

The MSG4 which is then contention resolution has its PDCCH CRC scrambled with the C-RNTI if the UE previously has a C-RNTI assigned. If the UE does not have a C-RNTI previously assigned has its PDCCH CRC is scrambled with the TC-RNTI.

Figure 9:
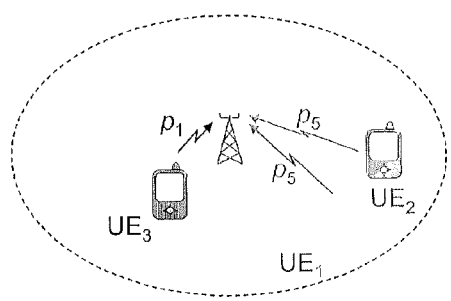
FIG. 9 illustrates contention-based random access between two UEs.

The procedure ends with RAN solving any preamble contention that may have occurred for the case that multiple UEs transmitted the same preamble at the same time. This can occur since each UE randomly selects when to transmit and which preamble to use. If multiple UEs select the same preamble for the transmission on RACH, there will be contention between these UEs that needs to be resolved through the contention resolution message (MSG4). The case when contention occurs is illustrated in FIG. 9, where two UEs transmit the same preamble, $p_5$, at the same time. A third UE also transmits at the same RACH, but since it transmits with a different preamble, $p_1$, there is no contention between this UE and the other two UEs.

The UE can also perform non-contention based random access. A non-contention based random access or contention free random access can e.g. be initiated by the eNB to get the UE to achieve synchronisation in UL. The eNB initiates a non-contention based random access either by sending a PDCCH order or indicating it in an RRC message. The later of the two is used in case of Handover (HO).

Figure 11:
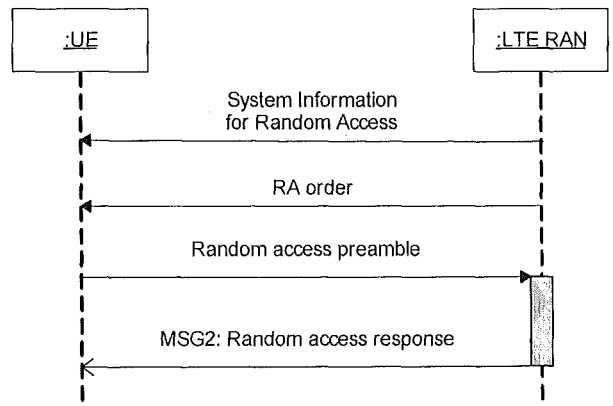
FIG. 11 illustrates signaling over the air interface for contention-free random access in LTE.

The eNB can also order the UE through a PDCCH message to perform a contention based random access. The procedure for the UE to perform contention free random access is illustrated in FIG. 11. Similar to the contention based random access the MSG2 is transmitted in the DL to the UE and its corresponding PDCCH message CRC is scrambled with the RA-RNTI. The UE considers the contention resolution successfully completed after it has received MSG2 successfully.

The message that contains a random access PDCCH order is DCI Format 1A with some of the fields modified:

| | |
|---|---|
| Flag 0/1A | 1 bit |
| Localized/distributed (L/D) flag | 1 bit |
| Resource block allocation | depends on bandwidth |
| Modulation and Coding Scheme (MCS) | 5 bits |
| Hybrid Automatic Report Request (HARQ) | 3 bits (TDD as 4 bits) |
| New Data Indicator (NDI) | 1 bit |
| Redundancy Version (RV) | 2 bits |
| Transmit Power Control (TPC) | 2 bits |
| Downlink Assignment Index (DAI) | 0 bits (TDD as 2 bits) |
| Aperiodic Sounding Reference Signal (SRS) flag | 0 bits (if configured 1 bit) |

Figure 10A:
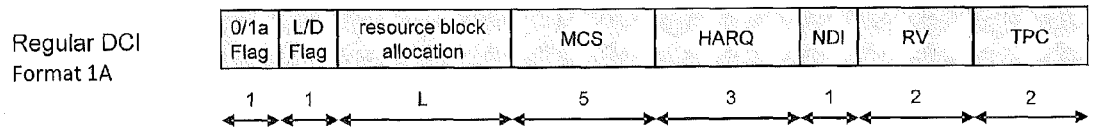
FIGS. 10A and 10B illustrate a DCI Format 1A and a PDCCH random access order format, respectively.
Figure 10B:
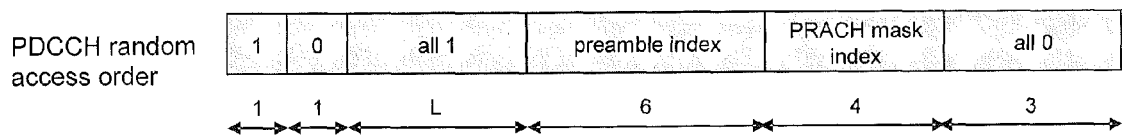

FIG. 10A illustrates the Downlink Control Information (DCI) Format 1A and FIG. 10B illustrates a PDCCH random access order. The figures are for FDD and without configured aperiodic SRS flag field. L is the number of bits needed to encode the resource block allocation and depends on the transmission bandwidth.

In the random access PDCCH Flag 0/1a is set to "1", the localized/distributed flag is set to "0", and all bits of the resource block allocation are set to "1". The next 10 bits are then used to encode the preamble index (6 bits) and PRACH mask index (4 bits), respectively. All remaining bits of the DCI message are set to "0". Based on the all "1" resource block allocation the UE is capable to distinguish the PDCCH order from a regular DCI Format 1a scheduling command.

For the contention free random access as for the contention based random access does the MSG2 contain a timing alignment value. This enables the eNB to set the initial/updated timing according to the UEs transmitted preamble.

In LTE in Rel-10 the random access procedure is limited to the primary cell only. This implies that the UE can only send a preamble on the primary cell. Further, MSG2 and MSG3 is only received and transmitted on the primary cell. MSG4 can however in Rel-10 be transmitted on any DL cell.

In LTE Rel-11, the current assumption (RAN2#74, June 2011) is that the random access procedure will be supported also on secondary cells, at least for the UEs supporting Rel-11 carrier aggregation. So far only network initiated random access on SCells is assumed.

1.1.4 PDCCH Processing

After channel coding, scrambling, modulation and interleaving of the control information, the modulated symbols are mapped to the resource elements in the control region. To multiplex multiple PDCCH onto the control region, Control Channel Elements (CCE) has been defined, where each CCE maps to 36 resource elements. One PDCCH can, depending on the information payload size and the required level of channel coding protection, consist of 1, 2, 4 or 8 CCEs, and the number is denoted as the CCE Aggregation Level (AL). By choosing the aggregation level, link-adaptation of the PDCCH is obtained. In total there are $N_{CCE}$ CCEs available for all the PDCCH to be transmitted in the subframe and the number $N_{CCE}$ varies from subframe to subframe depending on the number of control symbols n.

Figure 12:
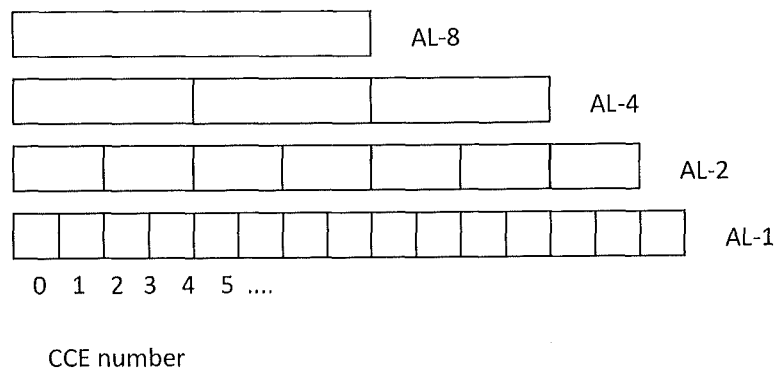
FIG. 12 conceptually illustrates search spaces with aggregation levels 8, 4, 2 and 1.

As $N_{CCE}$ varies from subframe to subframe, the terminal needs to blindly determine the position and the number of CCEs used for its PDCCH which can be a computationally intensive decoding task. Therefore, some restrictions in the number of possible blind decodings a terminal needs to go through have been introduced. For instance, the CCEs are numbered and CCE aggregation levels of size K can only start on CCE numbers evenly divisible by K. See FIG. 12, which illustrates CCE aggregation illustrating Aggregation Levels (AL) 8, 4, 2 and 1. The set of CCE where a terminal needs to blindly decode and search for a valid PDCCH are called search spaces. This is the set of CCEs on an AL a terminal should monitor for scheduling assignments or other control information. See the example in FIG. 13. In each subframe and on each AL, a terminal will attempt to decode all the PDCCHs that can be formed from the CCEs in its search space. If the CRC checks, then the content of the PDCCH is assumed to be valid for the terminal and it further processes the received information. Often two or more terminals will have overlapping search spaces and the network has to select one of them for scheduling of the control channel. When this happens, the non-scheduled terminal is said to be blocked. The search spaces varies pseudo-randomly from subframe to subframe to minimize this blocking probability.

A search space is further divided to a common and a terminal specific part. In the common search space, the PDCCH containing information to all or a group of terminals is transmitted (paging, system information, etc). If carrier aggregation is used, a terminal will find the common search space present on the Primary Cell (PCell) only. The common search space is restricted to aggregation levels 4 and 8 to give sufficient channel code protection for all terminals in the cell (since it is a broadcast channel, link adaptation cannot be used). The 2 and 4 first PDCCH (with lowest CCE number) in an AL of 8 or 4 respectively belongs to the common search space. For efficient use of the CCEs in the system, the remaining search space is terminal specific at each aggregation level.

Figure 13:
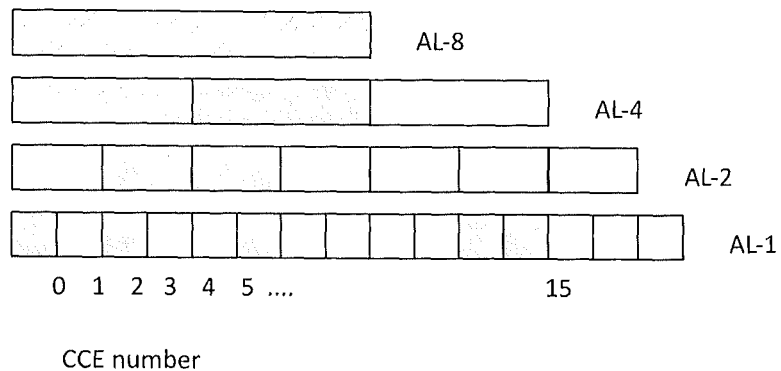
FIG. 13 conceptually illustrates a search space that is monitored by a UE.
Figure 14:
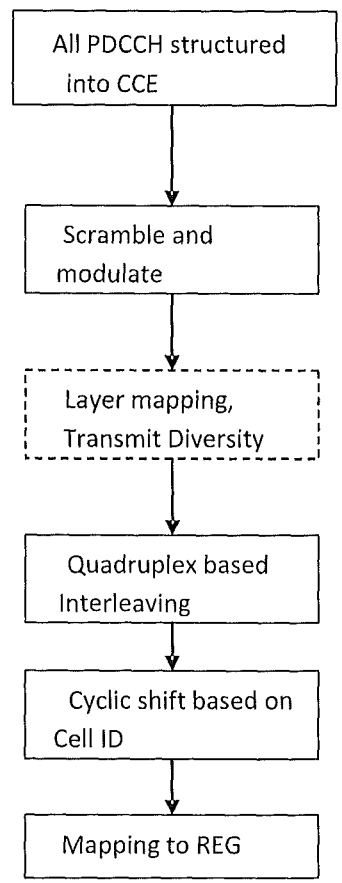
FIG. 14 illustrates operations that may be performed for a PDCCH to be transmitted in a subframe.

FIG. 13 is an example showing the search space (shaded) a certain terminal needs to monitor. In total there are $N_{CCE}=15$ CCEs in this example and the common search space is marked with stripes. A CCE consist of 36 QPSK modulated symbols that map to the 36 RE unique for this CCE. To maximize the diversity and interference randomization, interleaving of all the CCEs is used before a cell specific cyclic shift and mapping to REs, as illustrated in the processing steps in FIG. 14. Note that in most cases are some CCEs empty due to the PDCCH location restriction to terminal search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

Furthermore, to enable the use of 4 antenna TX diversity, a group of 4 adjacent QPSK symbols in a CCE is mapped to 4 adjacent RE, denoted an RE Group (REG). Hence, the CCE interleaving is quadruplex (group of 4) based and mapping process has a granularity of 1 REG and one CCE corresponds to 9 REGs (=36 RE).

There will also in general be a collection of REG that remains as leftovers after the set of size $N_{CCE}$ CCEs has been determined (although the leftover REGs are always fewer than 36 RE) since the number of REGs available for PDCCH in the system bandwidth is in general not an multiple of 9 REGs. These leftover REGs are in LTE unused by the system.

An LTE UE only monitors the common search space on the primary cell. Further the UE also monitors a set of UE specific search spaces for each of its aggregated DL/UL cells. The common search corresponds to 12 blind decodes and each UE specific search space corresponds to either 32 or 48 blind decodes depending if the UE does not support UL Multiple Input Multiple Output (MIMO) or if it does on the aggregated UL cell.

The UE monitors the following RNTI that are associated with the random access procedure for each associated search spaced on PDCCH:

The C-RNTI for a DCI Format 1A is monitored in common search and the UE specific search spaces. A DCI format received in the common search space is valid for the primary cell. DCI messages transmitted in the UE specific search space can contain a carrier indicator field (CIF) which indicates the serving cell the DCI is valid for. If the DCI does not contain a CIF the DCI is valid for the DL serving cell where it has been transmitted or the UL SIB2 linked to the DL serving cell. If CIF is used in a UE specific search space of a cell is RRC configured. A DCI Format 1A containing a PDCCH random access (MSG0) order is only transmitted on the PCell since up to Rel-10 random access is only specified for the PCell.

The RA-RNTI for MSG2 is monitored in the common search space on the primary cell.

The TC-RNTI for MSG3 is monitored in the common search on the primary cell, for reallocating the MSG3 in frequency.

The TC-RNTI for MSG4 is monitored in the common search and UE specific TC-RNTI search space on the primary cell.

The C-RNTI for MSG4 is monitored in the common search and UE specific C-RNTI search space on the primary cell.

2.0 High Level Description

Various embodiments described herein may arise from recognition that, without a CIF configured, a PDCCH cannot point to another cell, because the PDCCH is valid only for the cell that the PDCCH is transmitted upon. Unfortunately, many network operators or network vendors do not configure a CIF.

With a CIF configured, this problem may not exist and a PDCCH can be valid for another cell. Since in this case CIF is present in DCI Format 1A (and thus in a PDCCH random access order MSG0) the CIF can be used to identify the UL component carrier the PDCCH random access order is valid for.

However, without a configured CIF, this possibility would not exist. Moreover, it is also not possible to add extra bits to the DCI format since this may increase the number of blind decodes. Accordingly, without a configured CIF, it is not practical to order random access for a cell from another cell.

Various embodiments described herein may also arise from recognition that the DCI Format 1A used as PDCCH random access order contains several bits that are fixed or unused. According to various embodiments described herein, these unused bits can be used to encode the cell (such as the UL component carrier) on which the UE shall transmit the random access preamble. Cross-scheduled random access order transmitted is thereby provided.

3.0 Intermediate Level Description

Figure 15:
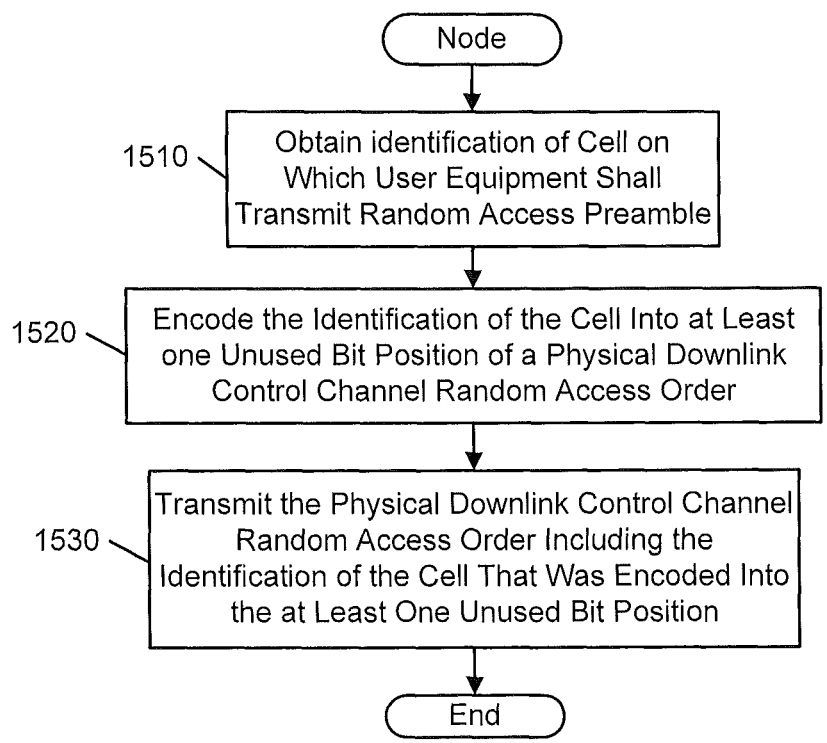
FIG. 15 is a flowchart of operations that may be performed by a node according to various embodiments described herein.

FIG. 15 is a flowchart of operations that may be performed to provide a physical downlink control channel random access order transmitting method for a node of a wireless network, according to various embodiments described herein. Referring to FIG. 15, at Block 1510, an identification of a cell on which a user equipment shall transmit a random access preamble is obtained. Operations at Block 1510 may be performed by processor circuitry of a node. Then, referring to Block 1520, an identification of the cell on which the user equipment shall transmit the random access preamble is encoded into at least one unused bit position of a physical downlink control channel random access order. Operations at Block 1520 may also be performed by processor circuitry at the node. Finally, at Block 1530, the physical downlink control channel random access order including the identification of the cell on which the user equipment shall transmit the random access preamble that was encoded into the at least one unused bit position of the physical downlink control channel random access order, is transmitted. Accordingly, at least one unused bit position in the physical downlink control channel random access order is used to encode an identification of the cell on which the user equipment shall transmit the random access preamble. Cross-scheduled random access order transmitting is thereby provided.

Figure 16:
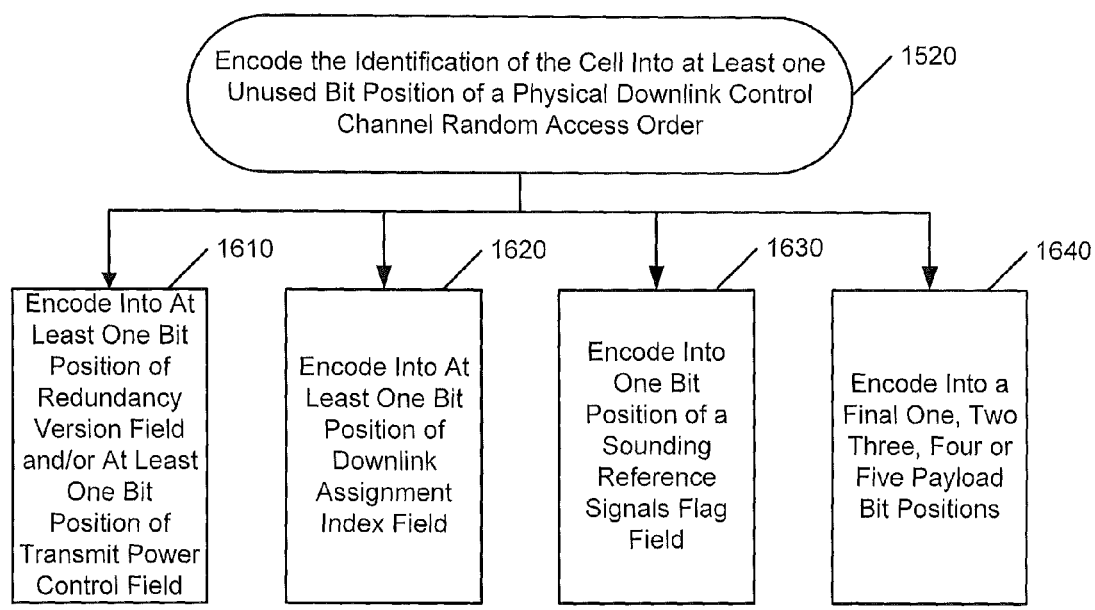
FIG. 16 is a flowchart of encoding by a node according to various embodiments described herein.

Many different unused bit positions may be used to encode the identification of the cell according to embodiments of Block 1520, as illustrated in FIG. 16. For example, as shown in Block 1610, when the physical downlink control channel random access order uses a downlink control information format, the at least one unused bit position comprises at least one bit position of a redundancy version field and/or at least one bit position of a transmit power control field, and in some embodiments one bit position of the redundancy version field and two bits of the transmit power control field are used. Alternatively, or in addition, as shown at Block 1620, when the physical downlink control channel random access order uses a downlink control information format, the at least one unused bit position comprises at least one bit position of a downlink assignment index field. In some embodiments, two bit positions of a downlink assignment index field are used. In addition, or alternatively, as illustrated at Block 1630, when the physical downlink control channel random access order uses a downlink control information format, the at least one unused bit position comprises a bit position of a sounding reference signals flag field.

It will also be understood that embodiments of Blocks 1610, 1620 and 1630 can be combined in various combinations and subcombinations. Thus, for example, embodiments of Blocks 1610 and 1620, Blocks 1610 and 1630, Blocks 1620 and 1630, or Blocks 1610, 1620 and 1630 may be provided according to various embodiments herein. Finally, as shown in Block 1640, the at least one unused bit position may comprise a final one, two, three, four or five payload bit positions of the downlink control information format.

Moreover, in any of the embodiments described in Blocks 1610-1640, the physical downlink control channel random access order may use a DCI Format 1A format and the at least one unused bit position comprises at least one unused bit position in the physical downlink control channel random access order that uses the DCI Format 1A format.

Figure 17:
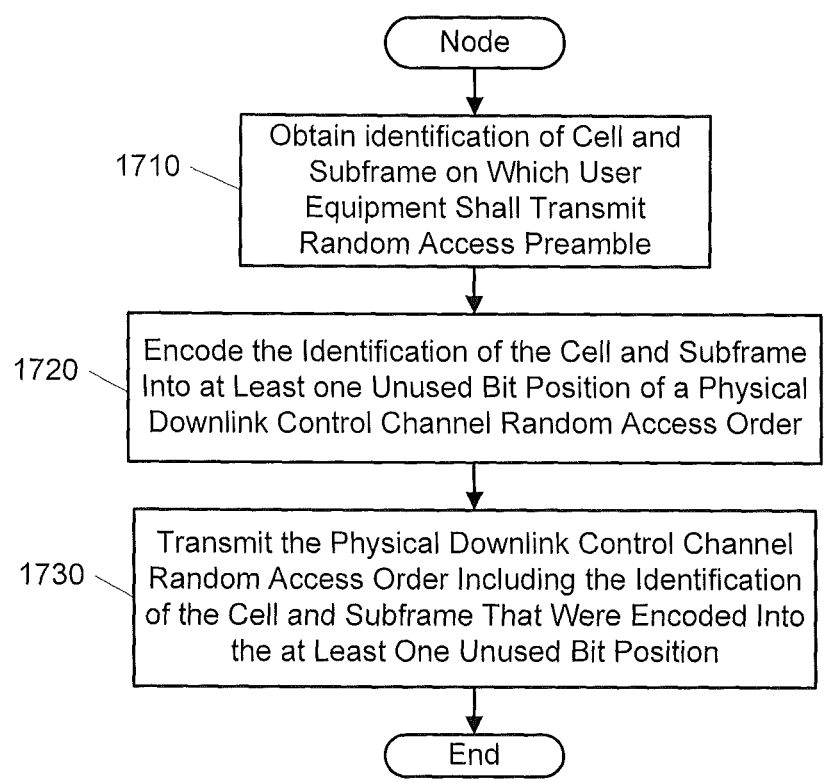
FIG. 17 is a flowchart of other operations that may be performed by a node according to various other embodiments described herein.

Various other embodiments described herein can also add identification of a subframe in the at least one unused bit position. Thus, as illustrated in FIG. 17, at Block 1710, an identification of a cell and subframe is obtained, and at Block 1720, the identification of the cell and subframe are encoded using, for example, any of the embodiments of Blocks 1610-1640 described above. Finally, at Block 1730, the physical downlink control channel random access order is transmitted with the identification of the cell and subframe.

Various other embodiments described herein may provide a random access preamble transmitting method for a user equipment of a wireless network. For example, as illustrated at Block 1810, the user equipment receives a physical downlink control channel random access order including an identification of a cell on which the user equipment shall transmit a random access preamble, wherein the identification of the cell is encoded into at least one unused bit position of the physical downlink control channel random access order that was received. Then, at Block 1820, the user equipment determines a cell for random access for the physical downlink control channel random access order that was received. It will be understood that operations of Blocks 1810 and 1820 may be performed by processor circuitry at the user equipment. Then, at Block 1830, the random access preamble is transmitted on the cell is identified. Operations of Block 1830 may be performed by a transmitter of the user equipment.

Figure 18:
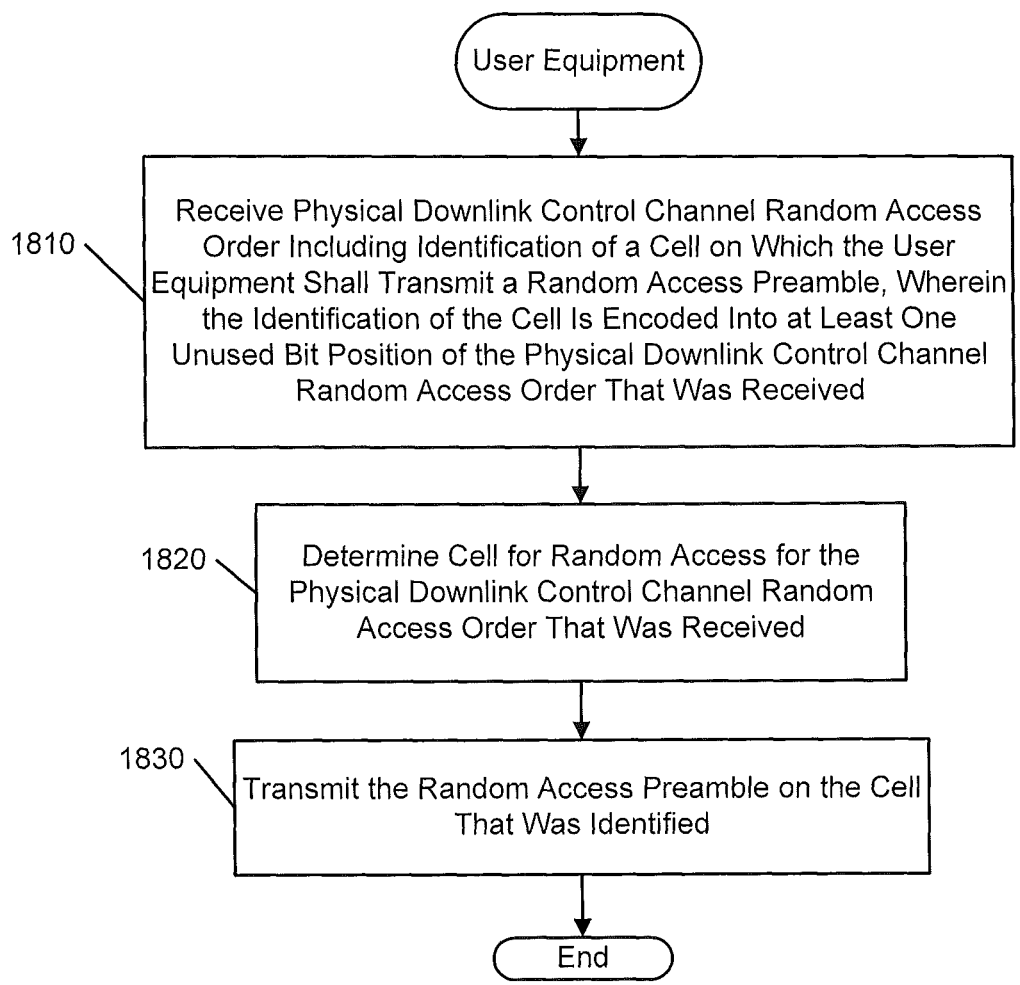
FIG. 18 is a flowchart of operations that may be performed by a user equipment according to various embodiments described herein.
Figure 19:
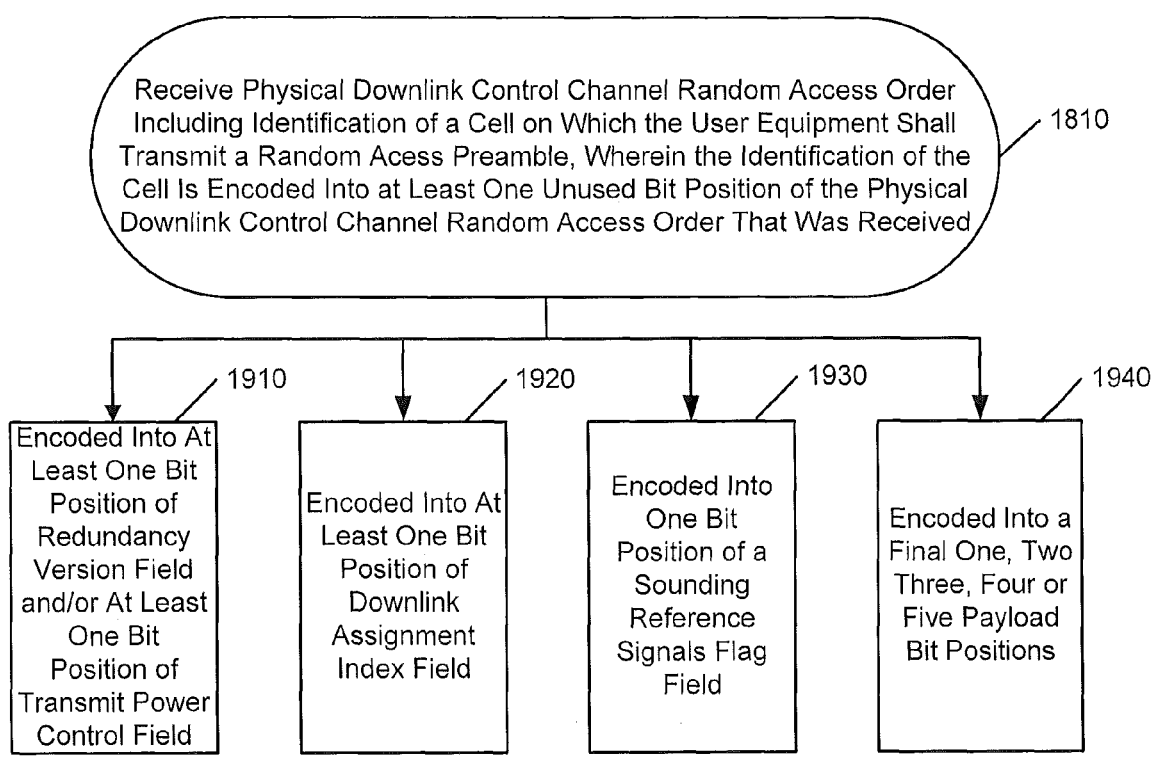
FIG. 19 is a flowchart of operations that may be performed by a user equipment to receive a physical downlink control channel random access order according to various embodiments described herein.

Various embodiments of the physical downlink control channel random access order may be received at Block 1810 of FIG. 18, as illustrated in FIG. 19. In FIG. 19, Blocks 1910, 1920, 1930 and 1940 for the user equipment correspond to respective Blocks 1610, 1620, 1630 and 1640 for the node. Accordingly, a description of Blocks 1910-1940 will not be repeated.

Figure 20:
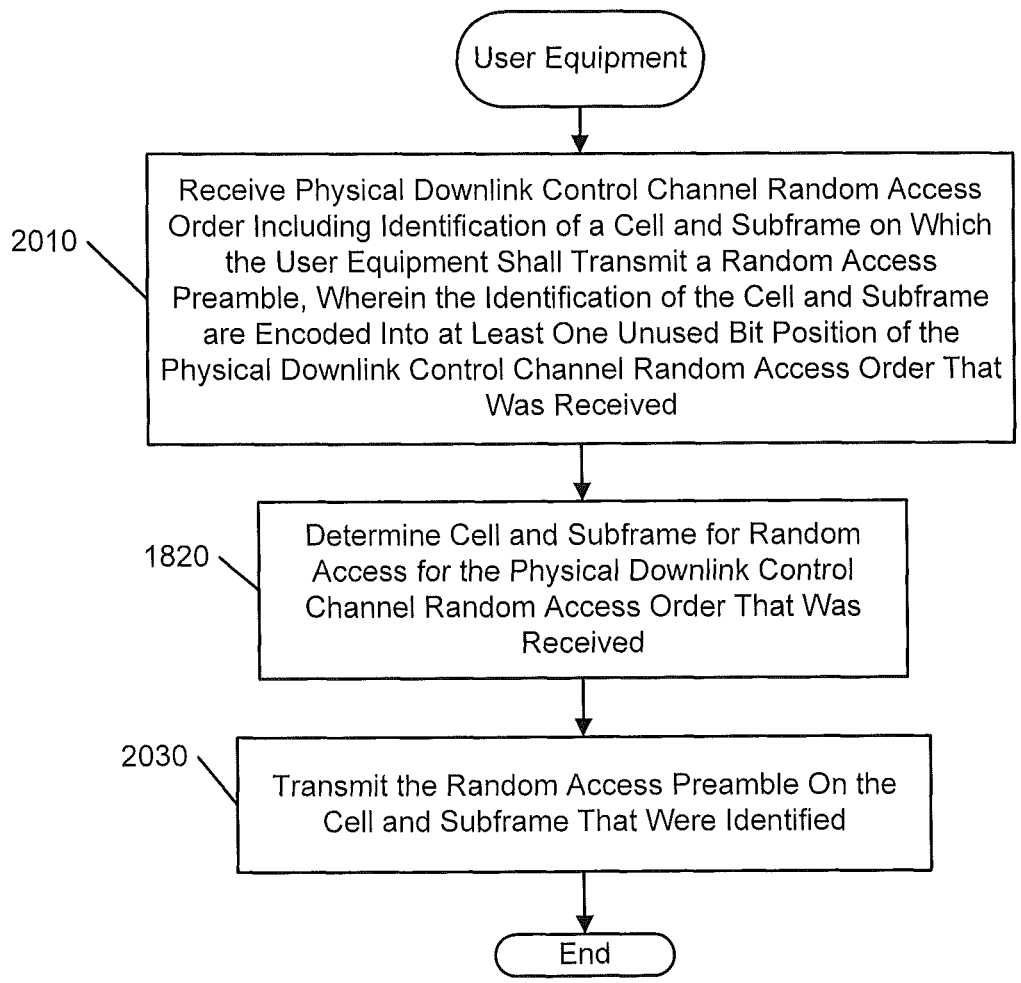
FIG. 20 is a flowchart of other operations that may be performed by a user equipment according to various other embodiments described herein.

Moreover, the user equipment may also process an encoding that identifies a cell and a subframe, as illustrated in FIG. 20. Thus, at Block 2010, the physical downlink control channel random access order that is received includes an identification of a cell and a subframe that are encoded into at least one unused bit position of the physical downlink control channel random access order. Operations at Block 1820 are then performed. Then, at Block 2030, the random access preamble is transmitted on the cell and subframe that were identified.

4.0 Detailed Technical Description

From FIGS. 10A and 10B, it can be seen that the PDCCH random access order contains many bits that are unused. The resource block allocation field contains all "1", however, this field is needed to distinguish the PDCCH random access order from a regular DCI Format 1A scheduling command.

In addition to the resource block allocation field, additional bits exist that are fixed set to "0" (parts of RV field and the TPC field in the regular DCI Format 1A). These bits are not needed to distinguish a PDCCH random access order from a regular DCI Format 1A scheduling command and can be used for other purposes.

FIGS. 10A and 10B show that in the given setup the number of bits that can be reused is 3. With 3 bits, up to 8 code points can be generated that can be used to indicate the target cell (UL component carrier) on which the random access preamble shall be sent. The 8 code points can either be mapped directly to the cell index to indicate the cell but also any other (new) identifier that uniquely identifies the cell can used. Accordingly, at least one bit position of the redundancy version field and/or at least one bit position of the transmit power control field may be used.

Figure 21:
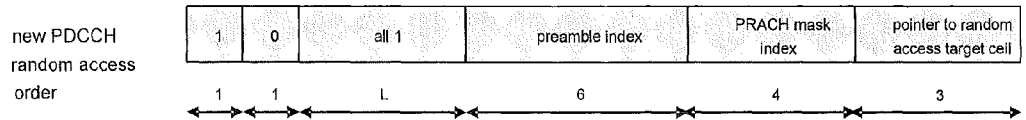
FIG. 21 illustrates a PDCCH random access order configured according to various embodiments described herein.

FIG. 21 illustrates PDCCH random access order where the at least 3 bits (RV and 2 TPC bits) are used to indicate the random access target cell (UL component carrier). L is the number of bits needed to encode the resource block allocation and depends on the transmission bandwidth. These embodiments also correspond to Blocks 1610 and 1910.

In other embodiments, in case of TDD, the 2 bit long DAI field is also available. This can either be left fixed to all "0" or these 2 bits can be (partly) combined with the original 3 bits to obtain in total 4 or 5 bits to indicate one out of 16 or 32 random access target cells (UL component carriers). Accordingly, as illustrated at Block 1620 and 1920, one or both bit positions of the DAI field may be used. Moreover, these DAI bit(s) may be used alone or in combination with the RV and/or TPC bit(s) of Blocks 1610 and 1910.

Figure 22:
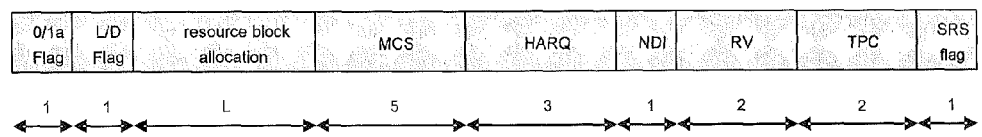
FIG. 22 illustrates a DCI Format 1A scheduling command.

According to other embodiments, if the aperiodic SRS flag is configured, another bit becomes available. See FIG. 22. FIG. 22 illustrates DCI Format 1A scheduling command with configured aperiodic SRS flag. L is the number of bits needed to encode the resource block allocation and depends on the transmission bandwidth.

Figure 23:
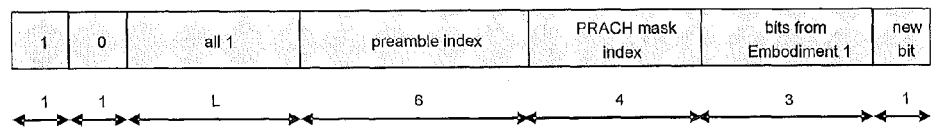
FIG. 23 illustrates a PDCCH random access order configured according to other embodiments described herein.

In the PDCCH random access order this bit is not used and can also be used to indicate the random access target cell (UL component carrier) as was illustrated in Blocks 1630 and 1930. See FIG. 22. If this bit is used alone (i.e., not together with embodiments of FIGS. 21 and 22), 2 random access target cells (UL component carrier) can be identified. If used together with the 3 bits identified in embodiments of FIG. 21, a 4 bit long indicator is obtained that can be used to address up to 16 random access target cells (UL component carrier). In TDD this indicator becomes 6 bits long enabling 64 random access target cells (UL component carrier). Accordingly, one bit position of the SRS signals flag may be used as illustrated in Blocks 1630 or 1930, alone or in combination with the RV, TPC and/or DAI bit(s). FIG. 23 illustrates a PDCCH random access order where 4 bits (3 bits from embodiments of FIG. 21 and newly identified bit) are used to indicate the random access target cell (UL component carrier). L is the number of bits needed to encode the resource block allocation and depends on the transmission bandwidth.

According to other embodiments, depending on the exact setup (TDD vs. FDD, SRS flag configured or not) not all code points that can be generated by the freed bit(s) may be needed for indicating the cell (UL component carrier) for the preamble transmission. In this case additional parameters for the following RACH procedure can be encoded with the remaining code points. Example parameters of such parameters could be cell and subframe in which the random access response will be transmitted, as was illustrated in FIGS. 17 and 20. This can be very beneficial in system management for interband carrier aggregation of TDD cells with different UL/DL configurations.

Figure 24:
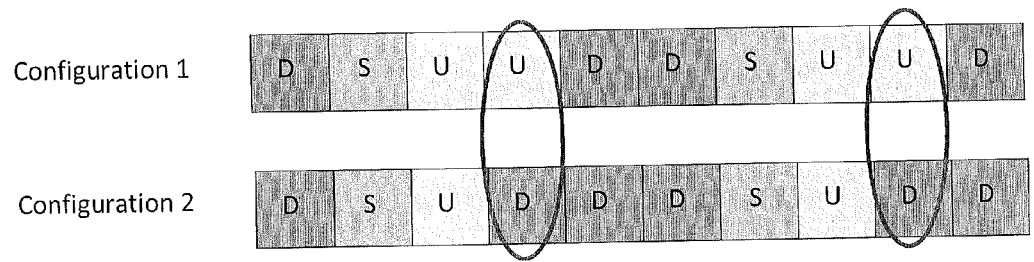
FIG. 24 conceptually illustrates subframes with conflicting uplink and downlink directions according to various embodiments described herein.

For such applications, as shown in FIG. 24, the aggregated cells may have different UL/DL subframe structures because the individual cells need to coexist with their respective neighboring cells. Various embodiments described herein can then be used to order a random access response at more precise subframes. For instance, the system can order the response to locate in subframes without conflicting UL/DL directions in the aggregated cells. This leaves the system with the flexibility to choose the UL/DL transmission for these subframes.

Accordingly, various embodiments described herein can enable cross-scheduling of PDCCH random access order without the need to change the size of the DCI Format 1A. Since the size need not be changed, this additional random access scheduling flexibility is obtained without the need to increase the number of blind decodings.

Additional discussion of various embodiments described herein will now be provided. Although various embodiments described herein may be implemented in any appropriate type of telecommunication system supporting any suitable communication standards using any suitable components, particular embodiments of the described solutions may be implemented in an LTE network, such as that illustrated in FIG. 25.

Figure 25:
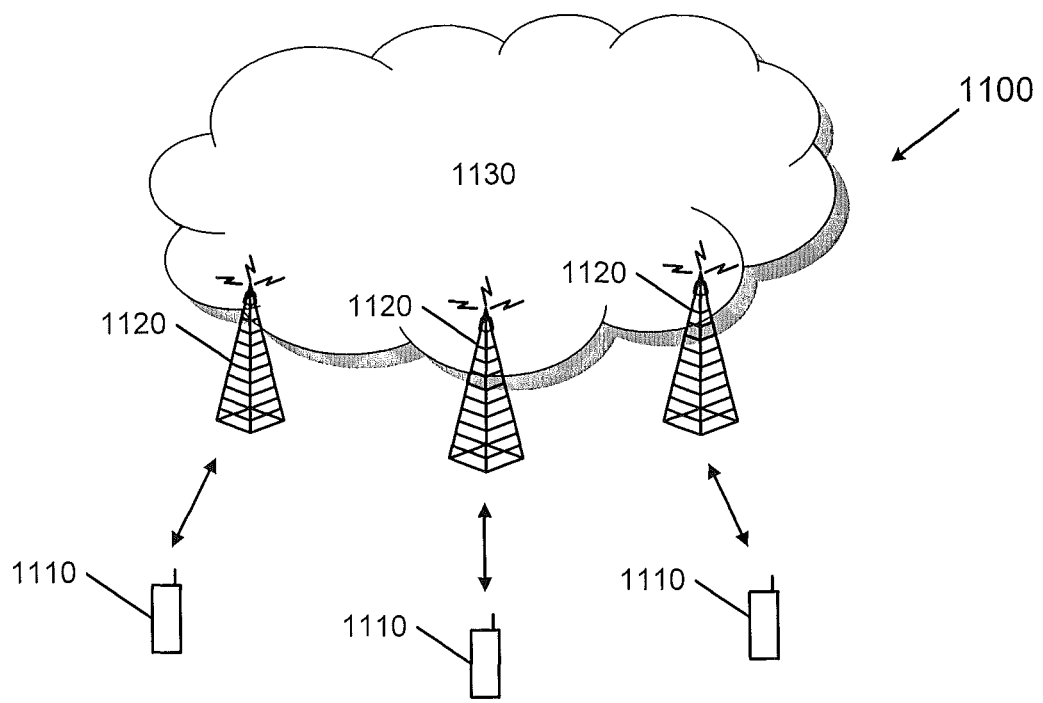
FIG. 25 is a block diagram of a wireless network according to various embodiments described herein.

As shown in FIG. 25, an example network 1100 may include one or more instances of UEs 1110 and one or more nodes 1120 capable of communicating with these UEs, along with any additional network elements 1130 suitable to support communication between UEs or between a UE and another communication device (such as a landline telephone). Although the illustrated UEs 1110 may represent communication devices that include any suitable combination of hardware and/or software, these UEs may, in particular embodiments, represent devices such as the example UE illustrated in greater detail by FIG. 26. Similarly, although the illustrated nodes 1120 may represent network nodes that include any suitable combination of hardware and/or software, these nodes may, in particular embodiments, represent devices such as the example nodes illustrated in greater detail by FIG. 27.

Figure 26:
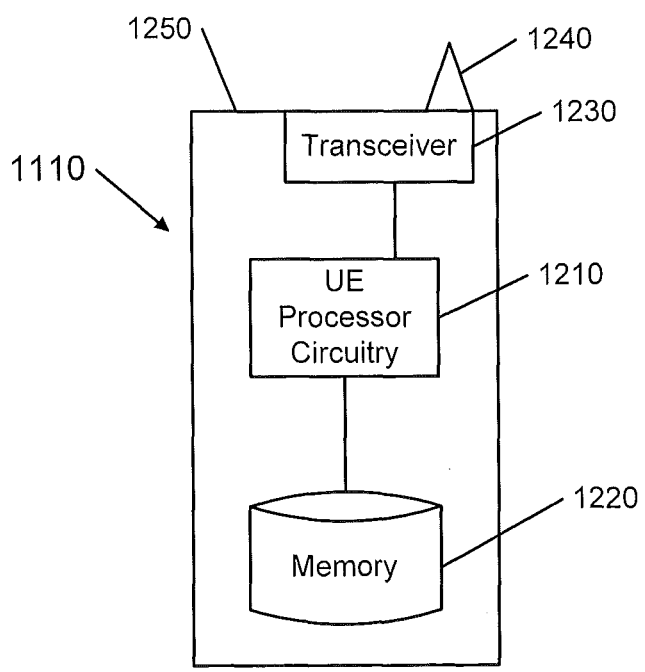
FIG. 26 is a block diagram of a user equipment according to various embodiments described herein.

As shown in FIG. 26, the example UE 1110 includes UE processor circuitry 1210, a memory 1220, a transceiver 1230, an antenna 1240 and a housing 1250. In particular embodiments, some or all of the functionality described above as being provided by a UE may be provided by the UE processor circuitry 1210 executing instructions stored on a computer-readable medium, such as the memory 1220 shown in FIG. 26. Alternative embodiments of the UE may include additional components beyond those shown in FIG. 26 that may be responsible for providing certain aspects of the UE's functionality, including any of the functionality described above and/or any functionality necessary to support the solution described above.

Accordingly, FIG. 26 illustrates a user equipment of a wireless network 1130. The user equipment 1110 includes, as part of its transceiver 1230, a receiver that is configured to receive a physical downlink control channel random access order including an identification of a cell on which the user equipment shall transmit a random access preamble, wherein the identification of the cell is encoded into at least one unused bit position of the physical downlink control channel random access order that was received. Moreover, UE processor circuitry 1210 is responsive to the receiver and is configured to determine a cell for random access for the physical downlink control channel random access order that was received. Finally, a transmitter that may also be part of the transceiver 1230 is responsive to the processor circuitry and is configured to transmit the random access preamble on the cell that is identified. The at least one unused bit position may be provided according to any of the embodiments described above.

Figure 27:
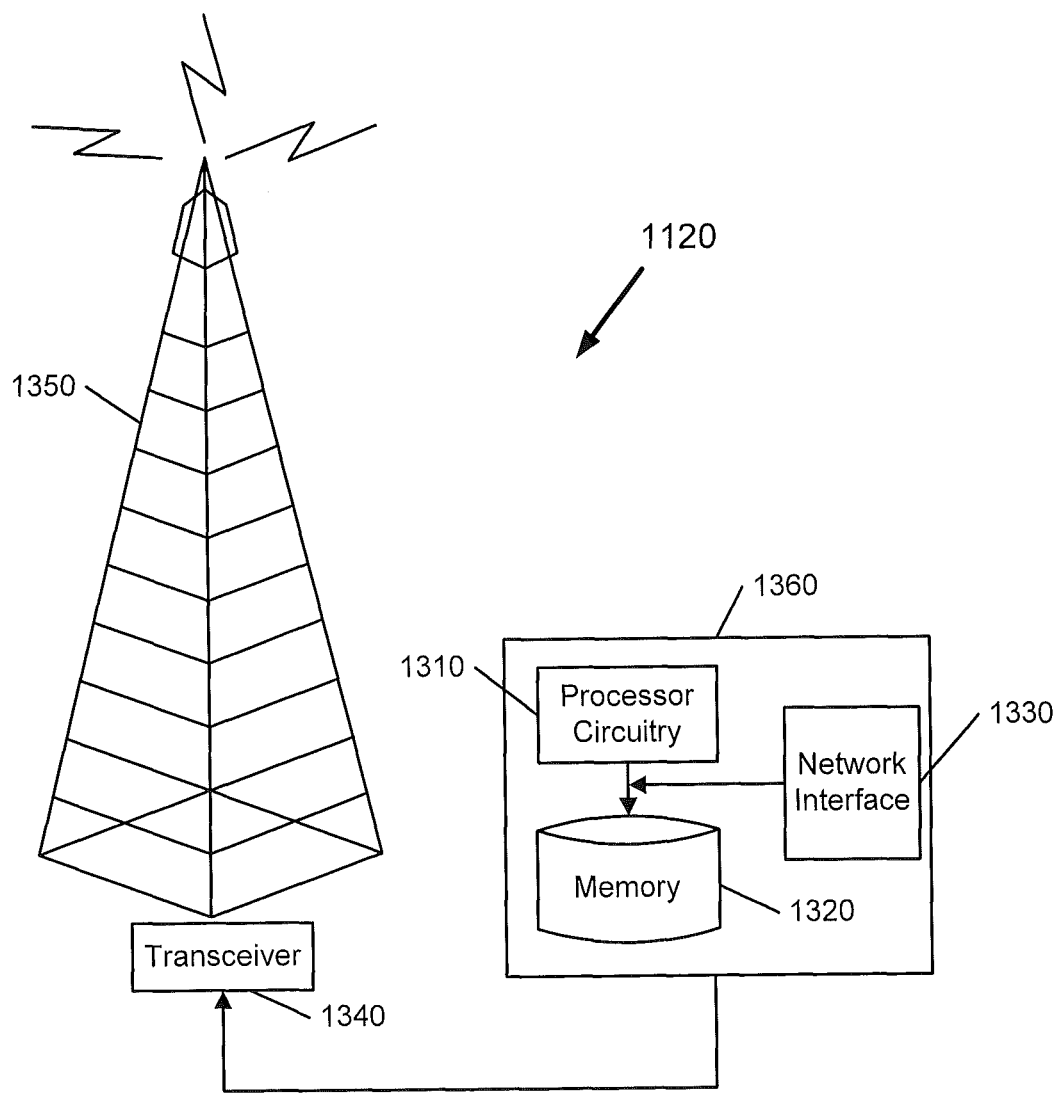
FIG. 27 is a block diagram of a node according to various embodiments described herein.

As shown in FIG. 27, the example node 1120 includes node processor circuitry 1310, a memory 1320, a transceiver 1340, an antenna 1350 and a housing 1360. In particular embodiments, some or all of the functionality described above as being provided by a home base station, an HeNB, an HNB, a pico/femto base station, a base station controller, a node B, an eNB, a relay, and/or any other type of mobile communications node may be provided by the node 1120 executing instructions stored on a computer-readable medium, such as the memory 1320 shown in FIG. 27. Accordingly, a node according to various embodiments described herein can include a wireless transceiver 1340 that is configured to wirelessly communicate with wireless User Equipment, such as the wireless User Equipment of FIG. 26, a network interface 1330 that is configured to establish a communication path to an element of a network 1130, and processor circuitry 1310. Alternative embodiments of the node 1120 may include additional components responsible for providing additional functionality, including any of the functionality identified above and/or any functionality necessary to support the solution described above.

Accordingly, FIG. 27 illustrates a node 1120 of a wireless network 1130 wherein the node comprises processor circuitry 1310 that is configured to obtain an identification of a cell on which a user equipment shall transmit a random access preamble and to encode the identification of the cell on which the user equipment shall transmit the random access preamble into at least one unused bit position of a physical downlink control channel random access order. Moreover, the node transceiver 1330 includes a transmitter that is responsive to the processor circuitry and is configured to transmit the physical downlink control channel random access order including the identification of the cell that was encoded into the at least one unused bit position of the physical downlink control channel random access order. Encoding may be performed according to any of the embodiments described above.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Various embodiments described herein can operate in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1410 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in various embodiments described herein. All these systems are designed to operate in a variety of bands typically known as the International Mobile Telecommunications (IMT) bands that are defined by the International Telecommunications Union—Radio Communication Bureau (ITU-R) and can, in general, be located in frequency ranges between 200 MHz and 5 GHZ within the current state of the art. It should, however, be noted that various embodiments described herein are equally applicable for any radio system, and are not restricted in any way to the IMT bands in any way.

For purposes of illustration and explanation only, various embodiments of the present invention were described herein in the context of user equipment that are configured to carry out cellular communications (e.g., cellular voice and/or data communications). It will be understood, however, that the present invention is not limited to such embodiments and may be embodied generally in any wireless communication terminal that is configured to transmit and receive according to one or more radio access technologies.

As used herein, the term "user equipment" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "node" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A node of a wireless network, the node comprising:
    processor circuitry that is configured to obtain an identification of a cell and a subframe on which a user equipment shall transmit a random access preamble and to encode the identification of the cell and the subframe on which the user equipment shall transmit the random access preamble into at least one unused bit position of a physical downlink control channel random access order; and
    a transmitter that is responsive to the processor circuitry and is configured to transmit the physical downlink control channel random access order including the identification of the cell and the subframe that was encoded into the at least one unused bit position of the physical downlink control channel random access order,
    wherein the physical downlink control channel random access order uses a downlink control information format and wherein the at least one unused bit position comprises at least one bit position of a redundancy version field and at least one bit position of a transmit power control field.

2. A node according to claim 1 wherein the at least one unused bit position further comprises at least one bit position of a downlink assignment index field.

3. A node according to claim 2 wherein the at least one unused bit position further comprises a bit position of a sounding reference signals flag field.

4. A node according to claim 1 wherein the at least one unused bit position further comprises a bit position of a sounding reference signals flag field.

5. A node according to claim 1 wherein the physical downlink control channel random access order uses a downlink control information format and wherein the at least one unused bit position comprises at least one bit position of a downlink assignment index field.

6. A node according to claim 5 wherein the at least one unused bit position further comprises a bit position of a sounding reference signals flag field.

7. A node according to claim 1 wherein the physical downlink control channel random access order uses a downlink control information format and wherein the at least one unused bit position comprises a bit position of a sounding reference signals flag field.

8. A node according to claim 1 wherein the at least one unused bit position comprises a final one, two, three, four or five payload bit positions of the downlink control information format.

9. A node according to claim 1 wherein the physical downlink control channel random access order uses a DCI Format 1A format and wherein the at least one unused bit position comprises at least one unused bit position in the physical downlink control channel random access order that uses the DCI Format 1A format.

10. A user equipment of a wireless network, the user equipment comprising:
    a receiver that is configured to receive a physical downlink control channel random access order including an identification of a cell and a subframe on which the user equipment shall transmit a random access preamble, wherein the identification of the cell and the subframe is encoded into at least one unused bit position of the physical downlink control channel random access order that was received;
    processor circuitry that is responsive to the receiver and is configured to determine a cell and the subframe for random access for the physical downlink control channel random access order that was received; and
    a transmitter that is responsive to the processor circuitry and is configured to transmit the random access preamble on the cell and in the subframe that is identified,
    wherein the physical downlink control channel random access order uses a downlink control information format and wherein the at least one unused bit position comprises at least one bit position of a redundancy version field and at least one bit position of a transmit power control field.

11. A user equipment according to claim 10 wherein the at least one unused bit position further comprises at least one bit position of a downlink assignment index field.

12. A user equipment according to claim 11 wherein the at least one unused bit position further comprises a bit position of a sounding reference signals flag field.

13. A user equipment according to claim 10 wherein the at least one unused bit position further comprises a bit position of a sounding reference signals flag field.

14. A user equipment according to claim 10 wherein the physical downlink control channel random access order uses a downlink control information format and wherein the at least one unused bit position comprises at least one bit position of a downlink assignment index field.

15. A user equipment according to claim 14 wherein the at least one unused bit position further comprises a bit position of a sounding reference signals flag field.

16. A user equipment according to claim 10 wherein the physical downlink control channel random access order uses a downlink control information format and wherein the at least one unused bit position corresponds to a bit position of a sounding reference signals flag field.

17. A user equipment according to claim 10 wherein the at least one unused bit position comprises a final one, two, three, four or five payload bit positions of the downlink control information format.

18. A user equipment according to claim 10 wherein the physical downlink control channel random access order uses a DCI Format 1A format and wherein the at least one unused bit position comprises at least one unused bit position in the physical downlink control channel random access order that uses the DCI Format 1A format.

19. A physical downlink control channel random access order transmitting method for a node of a wireless network, the method comprising:
    obtaining an identification of a cell and a subframe on which a user equipment shall transmit a random access preamble;
    encoding an identification of the cell and the subframe on which the user equipment shall transmit the random access preamble into at least one unused bit position of a physical downlink control channel random access order; and
    transmitting the physical downlink control channel random access order including the identification of the cell and the subframe on which the user equipment shall transmit the random access preamble that was encoded into the at least one unused bit position of the physical downlink control channel random access order, wherein the physical downlink control channel random access order uses a downlink control information format and wherein the at least one unused bit position comprises at least one bit position of a redundancy version field and at least one bit position of a transmit power control field.

20. A method according to claim 19 wherein the at least one unused bit position further comprises at least one bit position of a downlink assignment index field.

21. A method according to claim 20 wherein the at least one unused bit position further comprises a bit position of a sounding reference signals flag field.

22. A method according to claim 19 wherein the at least one unused bit position further comprises a bit position of a sounding reference signals flag field.

23. A method according to claim 19 wherein the physical downlink control channel random access order uses a downlink control information format and wherein the at least one unused bit position comprises at least one bit position of a downlink assignment index field.

24. A method according to claim 23 wherein the at least one unused bit position further comprises a bit position of a sounding reference signals flag field.

25. A method according to claim 19 wherein the physical downlink control channel random access order uses a downlink control information format and wherein the at least one unused bit position comprises a bit position of a sounding reference signals flag field.

26. A method according to claim 19 wherein the at least one unused bit position comprises a final one, two, three, four or five payload bit positions of the downlink control information format.

27. A method according to claim 19 wherein the physical downlink control channel random access order uses a DCI Format 1A format and wherein the at least one unused bit position comprises at least one unused bit position in the physical downlink control channel random access order that uses the DCI Format 1A format.

28. A random access preamble transmitting method for a user equipment of a wireless network, the method comprising:
    receiving a physical downlink control channel random access order including an identification of a cell and a subframe on which the user equipment shall transmit a random access preamble, wherein the identification of the cell and the subframe is encoded into at least one unused bit position of the physical downlink control channel random access order that was received;
    determining the cell and the subframe for random access for the physical downlink control channel random access order that was received; and
    transmitting the random access preamble on the cell and in the subframe that is identified,
    wherein the physical downlink control channel random access order uses a downlink control information format and wherein the at least one unused bit position comprises at least one bit position of a redundancy version field and at least one bit position of a transmit power control field.

29. A method according to claim 28 wherein the at least one unused bit position further comprises at least one bit position of a downlink assignment index field.

30. A method according to claim 29 wherein the at least one unused bit position further comprises a bit position of a sounding reference signals flag field.

31. A method according to claim 28 wherein the at least one unused bit position further comprises a bit position of a sounding reference signals flag field.

32. A method according to claim 28 wherein the physical downlink control channel random access order uses a downlink control information format and wherein the at least one unused bit position comprises at least one bit position of a downlink assignment index field.

33. A method according to claim 32 wherein the at least one unused bit position further comprises a bit position of a sounding reference signals flag field.

34. A method according to claim 28 wherein the physical downlink control channel random access order uses a downlink control information format and wherein the at least one unused bit position corresponds to a bit position of a sounding reference signals flag field.

35. A method according to claim 28 wherein the at least one unused bit position comprises a final one, two, three, four or five payload bit positions of the downlink control information format.

36. A method according to claim 28 wherein the physical downlink control channel random access order uses a DCI Format 1A format and wherein the at least one unused bit position comprises at least one unused bit position in the physical downlink control channel random access order that uses the DCI Format 1A format.

* * * * *

UNITED STATES PATENT AND TRADEMARK OFFICE
CERTIFICATE OF CORRECTION

PATENT NO.        : 8,824,415 B2                                           Page 1 of 1
APPLICATION NO.   : 13/421196
DATED             : September 2, 2014
INVENTOR(S)       : Cheng et al.

It is certified that error appears in the above-identified patent and that said Letters Patent is hereby corrected as shown below:

On Title Page 2, in item (56), under "OTHER PUBLICATIONS", in Column 2, Line 12, delete "Feb. 22, 2010," and insert -- Feb. 22, 2010-Feb. 26, 2010, --, therefor.

Signed and Sealed this
Twenty-fifth Day of August, 2015

Michelle K. Lee
*Director of the United States Patent and Trademark Office*